US012406610B2

(12) United States Patent
Wang et al.

(10) Patent No.: US 12,406,610 B2
(45) Date of Patent: Sep. 2, 2025

(54) DISPLAY SUBSTRATE, DRIVING METHOD THEREFOR, AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Benlian Wang, Beijing (CN); Yudiao Cheng, Beijing (CN); Zhenhua Zhang, Beijing (CN); Yuxin Zhang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/563,556

(22) PCT Filed: May 24, 2021

(86) PCT No.: PCT/CN2021/095575

§ 371 (c)(1),
(2) Date: Nov. 22, 2023

(87) PCT Pub. No.: WO2022/246610

PCT Pub. Date: Dec. 1, 2022

(65) Prior Publication Data

US 2024/0221590 A1 Jul. 4, 2024

(51) Int. Cl.
*G09G 3/30* (2006.01)
*G09G 3/20* (2006.01)

(52) U.S. Cl.
CPC ... *G09G 3/2092* (2013.01); *G09G 2300/0426* (2013.01); *G09G 2300/0452* (2013.01); *G09G 2300/0842* (2013.01)

(58) Field of Classification Search
CPC .......... G06F 3/041-048; G09G 3/2092; G09G 2300/0426; G09G 2300/0452; G09G 2300/0842
See application file for complete search history.

(56) References Cited

U.S. PATENT DOCUMENTS 10,379,397 B1 8/2019 Tang
2006/0262130 A1* 11/2006 Kim .................... G09G 3/3233 345/589

(Continued)

FOREIGN PATENT DOCUMENTS

CN 104252836 A 12/2014
CN 107871772 A 4/2018

(Continued)

OTHER PUBLICATIONS

China Patent Office, CN202180001239.9 First Office Action, Oct. 24, 2024.

*Primary Examiner* — Roy P Rabindranath
(74) *Attorney, Agent, or Firm* — HOUTTEMAN LAW LLC

(57) ABSTRACT

Embodiments of the present disclosure provide a display substrate, a driving method therefor, and a display apparatus. The display substrate has a display area and a bezel area. The display area includes a first display area and a second display area. The first display area has a light transmittance higher than that of the second display area. The first display area includes a plurality of pixel units distributed in an array, each pixel unit including a first subpixel and a second subpixel emitting different colors of light. The first display area includes a first initialization voltage line and a second initialization voltage line. The first initialization voltage line is electrically connected to the first subpixel, the second initialization voltage line is electrically connected to the second subpixel, and the first initialization voltage line and (Continued)

the second initialization voltage line are configured to receive different initialization voltages.

18 Claims, 10 Drawing Sheets

(56) References Cited

U.S. PATENT DOCUMENTS

| | | | | |
|---|---|---|---|---|
| 2014/0118409 | A1 | 5/2014 | Jun et al. | |
| 2015/0009194 | A1* | 1/2015 | Kim | G09G 3/3233 345/80 |
| 2021/0279440 | A1* | 9/2021 | Son | H04M 1/026 |

FOREIGN PATENT DOCUMENTS

| | | | |
|---|---|---|---|
| CN | 109671395 | A | 4/2019 |
| CN | 110223633 | A | 9/2019 |
| CN | 110232892 | A | 9/2019 |
| CN | 111653237 | A | 9/2020 |
| CN | 111696486 | A | 9/2020 |
| CN | 112037715 | A | 12/2020 |
| CN | 112216733 | A | 1/2021 |
| CN | 112466244 | A | 3/2021 |
| KR | 20190113708 | A | 10/2019 |
| KR | 20200072956 | A | 6/2020 |

* cited by examiner

DISPLAY SUBSTRATE, DRIVING METHOD THEREFOR, AND DISPLAY APPARATUS

TECHNICAL FIELD

The present disclosure relates to the field of display technology, and particularly relates to a display substrate, a driving method therefor, and a display apparatus.

BACKGROUND

With the rapid development of smart phones, the phones should not only have attractive appearance, but also bring more excellent visual experience to users. Various manufacturers start to increase the screen-to-body ratio of the smart phone, so that the full screen becomes a new competitive point of smart phones. With the development of full screens, demands on promoted performance and functions are also increased, and an under-display camera can bring about impacts on the vision and use experience to some extent under the prerequisite of not impairing a high screen-to-body ratio.

SUMMARY

An embodiment of the present disclosure provides a display substrate, having a display area and a bezel area, where the display area includes: a first display area and a second display area; the first display area has a light transmittance higher than a light transmittance of the second display area;

the first display area includes a plurality of pixel units distributed in an array, each pixel unit including a first subpixel and a second subpixel emitting different colors of light; and the first display area includes a first initialization voltage line and a second initialization voltage line, where the first initialization voltage line is electrically connected to the first subpixel, the second initialization voltage line is electrically connected to the second subpixel, and the first initialization voltage line and the second initialization voltage line are configured to receive different initialization voltages.

Optionally, in the above-described display substrate provided in the embodiment of the present disclosure, each pixel unit further includes a third subpixel emitting light of a color different from the colors of both the first subpixel and the second subpixel, and the third subpixel is electrically connected to the second initialization voltage line.

Optionally, the above-described display substrate provided in the embodiment of the present disclosure includes a base substrate, a first gate metal layer, a second gate metal layer, and a source/drain metal layer which are sequentially stacked;

the first initialization voltage line and the second initialization voltage line are arranged in the same layer as the first gate metal layer; or, the first initialization voltage line and the second initialization voltage line are arranged in the same layer as the second gate metal layer; or, one of the first initialization voltage line and the second initialization voltage line is arranged in the same layer as the first gate metal layer, while the other is arranged in the same layer as the second gate metal layer.

Optionally, in the above-described display substrate provided in the embodiment of the present disclosure, each of the first, second, and third subpixels include a light-emitting device, and a driving circuit in the bezel area or the second display area;

the driving circuit includes a first initialization transistor, a second initialization transistor, a driving transistor, a data writing transistor, a threshold compensation transistor, a first light emission control transistor, a second light emission control transistor, and a storage capacitor;

a gate of the first initialization transistor is electrically connected to a reset signal line, a first electrode of a first initialization transistor in a driving circuit corresponding to the first subpixel is electrically connected to the first initialization voltage line, first electrodes of first initialization transistors in driving circuits corresponding to the second subpixel and the third subpixel are each electrically connected to the second initialization voltage line, and a second electrode of the first initialization transistor is electrically connected to a gate of the driving transistor;

a gate of the second initialization transistor is electrically connected to a scanning signal line, a first electrode of a second initialization transistor in the driving circuit corresponding to the first subpixel is electrically connected to the first initialization voltage line, first electrodes of second initialization transistors in the driving circuits corresponding to the second subpixel and the third subpixel are each electrically connected to the second initialization voltage line, and a second electrode of the second initialization transistor is electrically connected to an anode of the light-emitting device;

a gate of the first light emission control transistor is electrically connected to a light emission control line, a first electrode of the first light emission control transistor is electrically connected to a first power supply line, and a second electrode of the first light emission control transistor is electrically connected to a first electrode of the driving transistor;

a gate of the second light emission control transistor is electrically connected to the light emission control line, a first electrode of the second light emission control transistor is electrically connected to a second electrode of the driving transistor, and a second electrode of the second light emission control transistor is electrically connected to the anode of the light-emitting device; a cathode of the light-emitting device is electrically connected to a second power supply line;

a gate of the threshold compensation transistor is electrically connected to the scanning signal line, a first electrode of the threshold compensation transistor is electrically connected to the gate of the driving transistor, and a second electrode of the threshold compensation transistor is electrically connected to the second electrode of the driving transistor;

a gate of the data writing transistor is electrically connected to the scanning signal line, a first electrode of the first data writing transistor is electrically connected to a data signal line, and a second electrode of the data writing transistor is electrically connected to the first electrode of the driving transistor; and a first electrode of the storage capacitor is electrically connected to the first power supply line, and a second electrode of the storage capacitor is electrically connected to the gate of the driving transistor.

Optionally, in the above-described display substrate provided in the embodiment of the present disclosure, each pixel unit further includes a third subpixel emitting light of a color different from the colors of both the first subpixel and the second subpixel; and the first display area further includes a third initialization voltage line electrically connected to the third subpixel and configured to receive an initialization voltage different from the initialization voltages of the first initialization voltage line and the second initialization voltage line.

Optionally, the above-described display substrate provided in the embodiment of the present disclosure includes a base substrate, a first gate metal layer, a second gate metal layer, and a source/drain metal layer which are sequentially stacked;

the first initialization voltage line, the second initialization voltage line and the third initialization voltage line are arranged in the same layer as the first gate metal layer; or, the first initialization voltage line, the second initialization voltage line and the third initialization voltage line are arranged in the same layer as the second gate metal layer; or, two of the first initialization voltage line, the second initialization voltage line and the third initialization voltage line are arranged in the same layer as the first gate metal layer, while the rest one is arranged in the same layer as the second gate metal layer.

Optionally, in the above-described display substrate provided in the embodiment of the present disclosure, each of the first, second, and third subpixels include a light-emitting device, and a driving circuit in the bezel area or the second display area;

the driving circuit includes a first initialization transistor, a second initialization transistor, a driving transistor, a data writing transistor, a threshold compensation transistor, a first light emission control transistor, a second light emission control transistor, and a storage capacitor;

a gate of the first initialization transistor is electrically connected to a reset signal line, a first electrode of a first initialization transistor in a driving circuit corresponding to the first subpixel is electrically connected to the first initialization voltage line, a first electrode of a first initialization transistor in a driving circuit corresponding to the second subpixel is electrically connected to the second initialization voltage line, a first electrode of a first initialization transistor in a driving circuit corresponding to the third subpixel is electrically connected to the third initialization voltage line, and a second electrode of the first initialization transistor is electrically connected to a gate of the driving transistor;

a gate of the second initialization transistor is electrically connected to a scanning signal line, a first electrode of a second initialization transistor in the driving circuit corresponding to the first subpixel is electrically connected to the first initialization voltage line, a first electrode of a second initialization transistor in the driving circuit corresponding to the second subpixel is electrically connected to the second initialization voltage line, a first electrode of a second initialization transistor in the driving circuit corresponding to the third subpixel is electrically connected to the third initialization voltage line, and a second electrode of the second initialization transistor is electrically connected to an anode of the light-emitting device;

a gate of the first light emission control transistor is electrically connected to a light emission control line, a first electrode of the first light emission control transistor is electrically connected to a first power supply line, and a second electrode of the first light emission control transistor is electrically connected to a first electrode of the driving transistor;

a gate of the second light emission control transistor is electrically connected to the light emission control line, a first electrode of the second light emission control transistor is electrically connected to a second electrode of the driving transistor, and a second electrode of the second light emission control transistor is electrically connected to the anode of the light-emitting device; a cathode of the light-emitting device is electrically connected to a second power supply line;

a gate of the threshold compensation transistor is electrically connected to the scanning signal line, a first electrode of the threshold compensation transistor is electrically connected to the gate of the driving transistor, and a second electrode of the threshold compensation transistor is electrically connected to the second electrode of the driving transistor;

a gate of the data writing transistor is electrically connected to the scanning signal line, a first electrode of the first data writing transistor is electrically connected to a data signal line, and a second electrode of the data writing transistor is electrically connected to the first electrode of the driving transistor; and a first electrode of the storage capacitor is electrically connected to the first power supply line, and a second electrode of the storage capacitor is electrically connected to the gate of the driving transistor.

Optionally, in the above-described display substrate provided in the embodiment of the present disclosure, the driving circuit is located in a part of the bezel area adjacent to the first display area; or, the second display area has a transition area adjacent to the first display area, and the driving circuit is located in the transition area.

Optionally, in the above-described display substrate provided in the embodiment of the present disclosure, the first subpixel is a green subpixel, the second subpixel is a red subpixel, and the third subpixel is a blue subpixel.

Optionally, the above-described display substrate provided in the embodiment of the present disclosure further includes at least one transparent wiring layer between the driving circuit and the anode of the light-emitting device, and the driving circuit and the anode are electrically connected via a transparent wire in the transparent wiring layer.

Optionally, in the above-described display substrate provided in the embodiment of the present disclosure, the first display area has a resolution lower than a resolution of the second display area, or the first display area and the second display area have substantially the same resolution.

Optionally, in the above-described display substrate provided in the embodiment of the present disclosure, the first display area has a shape including at least one of a circular shape, an elliptical shape, a rectangular shape, or a polygonal shape.

Accordingly, an embodiment of the present disclosure further provides a display apparatus, including a photosensitive device, and the display substrate as described above; where the photosensitive device is disposed in the first display area of the display substrate.

Accordingly, an embodiment of the present disclosure further provides a method for driving the display substrate as described above, including:

in an initialization stage, loading a first initialization voltage to the first subpixel through the first initialization voltage line, and loading a second initialization voltage to the second subpixel through the second initialization voltage line;

where the first initialization voltage is greater than the second initialization voltage.

Optionally, the above-described method provided in the embodiment of the present disclosure further includes:

in the initialization stage, loading the second initialization voltage to the third subpixel through the second initialization voltage line.

Optionally, in the above-described method provided in the embodiment of the present disclosure, the first initialization voltage is greater than the second initialization voltage by substantially 0.5V.

Optionally, in the above-described method provided in the embodiment of the present disclosure, each pixel unit in the first display area further includes a third subpixel emitting light of a color different from the colors of both the first subpixel and the second subpixel; and the display area of the display substrate further includes a third initialization voltage line electrically connected to the third subpixel and configured to receive an initialization voltage different from the initialization voltages of the first initialization voltage line and the second initialization voltage line; and the above-described method further includes:

in the initialization stage, loading a third initialization voltage to the third subpixel through the third initialization voltage line;

where the third initialization voltage is less than the second initialization voltage.

Optionally, in the above-described method provided in the embodiment of the present disclosure, the first initialization voltage is greater than the second initialization voltage by substantially 0.2V, and the second initialization voltage is greater than the third initialization voltage by substantially 0.3V.

BRIEF DESCRIPTION OF DRAWINGS

In order to explain the technical solutions in the embodiments of the present disclosure more clearly, the drawings to be used in the description of the embodiments will be briefly described below. Apparently, the drawings in the following description are merely some embodiments of the present disclosure, and other drawings may be derived from these drawings by those of ordinary skill in the art without any creative labor.

DETAIL DESCRIPTION OF EMBODIMENTS

Figure 1:
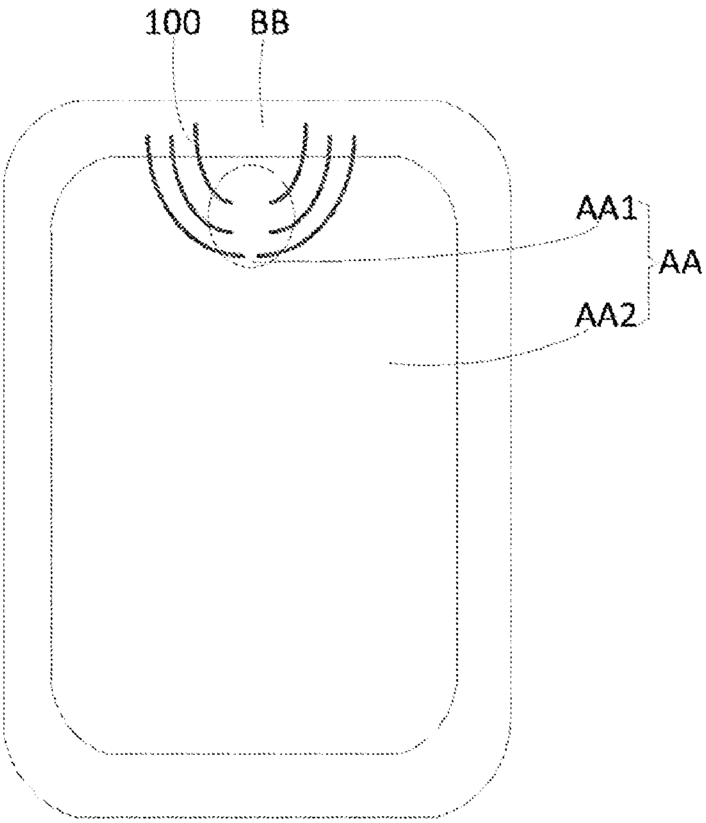
FIG. 1 is a schematic top view of a display substrate according to an embodiment of the present disclosure.

To make the objects, technical solutions and advantages of the embodiments of the present disclosure more apparent, the technical solutions according to the embodiments of the present disclosure will be clearly and completely described below with reference to the drawings of the embodiments of the present disclosure. Apparently, the described embodiments are some, but not all, of the embodiments of the present disclosure. Further, the embodiments of the present disclosure and features thereof may be combined with each other as long as they are not contradictory. All other embodiments obtained by those of ordinary skill in the art based on the embodiments of the present disclosure described herein without paying any creative effort shall be included in the protection scope of the present disclosure.

Unless otherwise defined, technical or scientific terms used in the present disclosure are intended to have general meanings as understood by those of ordinary skill in the art. The words "first", "second" and similar terms used in the present disclosure do not denote any order, quantity, or importance, but are used merely for distinguishing different components from each other. The word "include" or "comprise" or the like means that the element or item preceding the word includes elements or items that appear after the word or equivalents thereof, but does not exclude other elements or items. The terms "connected" or "coupled" and the like are not restricted to physical or mechanical connections, but may include electrical connections, whether direct or indirect.

It should be noted that the sizes and shapes of various components in the drawings are not to scale, but are merely intended to schematically illustrate the present disclosure. The same or similar reference signs refer to the same or similar elements or elements with the same or similar functions throughout the drawings.

Figure 2:
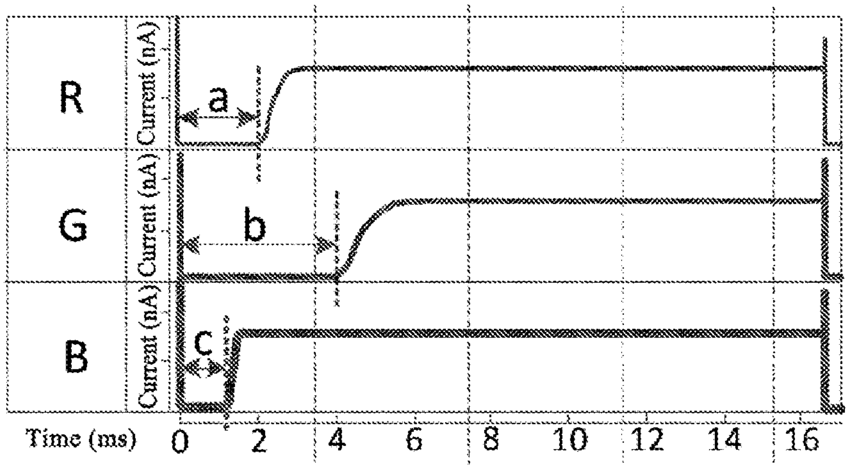
FIG. 2 is a schematic simulation diagram of lighting time of three subpixels according to an embodiment of the present disclosure.

As shown in FIG. 1, in the under-display camera technology, a display area AA is typically provided with a first display area AA1 and a second display area AA2. The second display area AA2 occupies most of the display area, while the first display area AA1 occupies a smaller portion of the display area, and the first display area AA1 is a position where the under-display camera is disposed. The under-display camera refers to a forward camera positioned under the screen without influencing the display function of the screen, and when the forward camera is not used, the screen above the camera can still perform normal display. Therefore, no camera hole will be formed for the under-display camera in appearance, and a real full screen display effect is achieved. However, current designs of the under-display camera typically involve disposing a pixel circuit of the first display area AA1 in a bezel area BB above the first display area AA1, or in a part of the second display area AA2 adjacent to the first display area AA1. Taking the pixel circuit in the bezel area BB above the first display area AA1 as an example, the pixel circuit is connected to a light-emitting device in the first display area AA1 through an ITO wire 100, so that peripheral pixel signals are transmitted to an area of the under-display camera. However, due to overlength of the ITO wire 100, the R/G/B subpixels in the first display area AA1 have prolonged and different lighting times (corresponding to a, b, c, respectively). As shown in FIG. 2, the subpixel B is lit first, then the subpixel R, and then the subpixel G. Since the subpixel G takes the longest time to be lit, human eyes perceive purple during display, leading to the problem of purple display defect in the first display area AA1.

In order to solve the above problem, an embodiment of the present disclosure provides a display substrate which, as shown in FIG. 1, has a display area AA and a bezel area BB. The display area AA includes a first display area AA1 and a second display area AA2. The first display area AA1 has a light transmittance higher than that of the second display area AA2.

The first display area AA1 includes a plurality of pixel units (not shown) distributed in an array, each pixel unit including a first subpixel (not shown) and a second subpixel (not shown) emitting different colors of light.

The first display area AA1 includes a first initialization voltage line (not shown) and a second initialization voltage line (not shown). The first initialization voltage line is electrically connected to the first subpixel, the second initialization voltage line is electrically connected to the second subpixel, and the first initialization voltage line and the second initialization voltage line are configured to receive different initialization voltages.

According to the above-described display substrate provided in the embodiments of the present disclosure, since the lighting time (i.e., charging time) of the subpixel is closely related with a potential at an anode of the light-emitting device (which will be described later), and the potential at the anode of the light-emitting device is related to an initialization voltage, the charging time (i.e., lighting time) may be reduced by increasing the initialization voltage. Therefore, by transmitting initialization voltages to the first subpixel and the second subpixel by the first initialization voltage line and the second initialization voltage line in the display substrate respectively, the embodiments of the present disclosure can enable the first subpixel and the second subpixel to receive different initialization voltages. In this way, for example, when the purple defect occurs in the first display area AA1 due to the fact that the first subpixel in the first display area AA1 takes a too long time to be lit, an initialization voltage, which is greater than the initialization voltage input into the second subpixel by the second initialization voltage line, can be input into the first subpixel by the first initialization voltage line to enable consistent charging time of the first and second subpixels, thereby solving the problem of purple defect in the first display area AA1.

In a specific implementation, in the display substrate provided in the embodiment of the present disclosure, the first subpixel is a green subpixel G, and the second subpixel is a red subpixel R. As shown in FIG. 2, since the green subpixel G takes a longer time to be lit than the red subpixel R, the initialization voltage input into the green subpixel G may be set to be higher than that input into the red subpixel R, so that the first and second subpixels have consistent charging time and the problem of purple defect in the first display area AA1 is solved.

In a specific implementation, in the display substrate provided in the embodiment of the present disclosure, as shown in FIG. 1, each pixel unit in the first display area AA1 further includes a third subpixel (blue subpixel B) emitting light of a color different from those of both the first subpixel (green subpixel G) and the second subpixel (red subpixel R), and the third subpixel (blue subpixel B) is electrically connected to the second initialization voltage line. As shown in FIG. 2, since the green subpixel G takes a longer time to be lit than the red subpixel R, the red subpixel R takes a longer time to be lit than the blue subpixel B, and the difference in lighting time between the red subpixel R and the blue subpixel B is small, the third subpixel (blue subpixel B) may be electrically connected to the second initialization voltage line. That is, the initialization voltage input into the green subpixel G may be set to be higher than that input into the red subpixel R, and the initialization voltages input into the red subpixel R and the blue subpixel B may be set to be the same, so that the first, second and third subpixels have consistent charging time, and the problem of purple defect in the first display area AA1 is solved.

In a specific implementation, the display substrate provided in the embodiment of the present disclosure includes a base substrate, a first gate metal layer, a second gate metal layer, and a source/drain metal layer which are sequentially stacked and insulated from each other.

The first initialization voltage line and the second initialization voltage line are arranged in the same layer as the first gate metal layer; or, the first initialization voltage line and the second initialization voltage line are arranged in the same layer as the second gate metal layer; or, one of the first initialization voltage line and the second initialization voltage line is arranged in the same layer as the first gate metal layer, while the other is arranged in the same layer as the second gate metal layer.

Specifically, in order to simplify the manufacturing process and ensure the thickness of the display substrate, in this embodiment, the first initialization voltage line and the second initialization voltage line are arranged in the same layer and made of the same material as the first gate metal layer and/or the second gate metal layer, so that the first initialization voltage line and the second initialization voltage line can be synchronously manufactured while the first gate metal layer and the second gate metal layer are prepared. The first initialization voltage line and the second initialization voltage line may be both disposed in the first gate metal layer, or both disposed in the second gate metal layer, or disposed with one in the first gate metal layer and the other in the second gate metal layer. Since the second gate metal layer is typically provided with an electrode plate of a capacitor and thus has larger space, it is preferred that both the first initialization voltage line and the second initialization voltage line are disposed in the second gate metal layer.

In a specific implementation, in the display substrate provided in the embodiment of the present disclosure, as shown in FIG. 1, the first subpixel (green subpixel G), the second subpixel (red subpixel R) and the third subpixel (blue subpixel B) in the first display area AA1 each include a light-emitting device, and a driving circuit in the bezel area BB or the second display area AA2.

Figure 3:
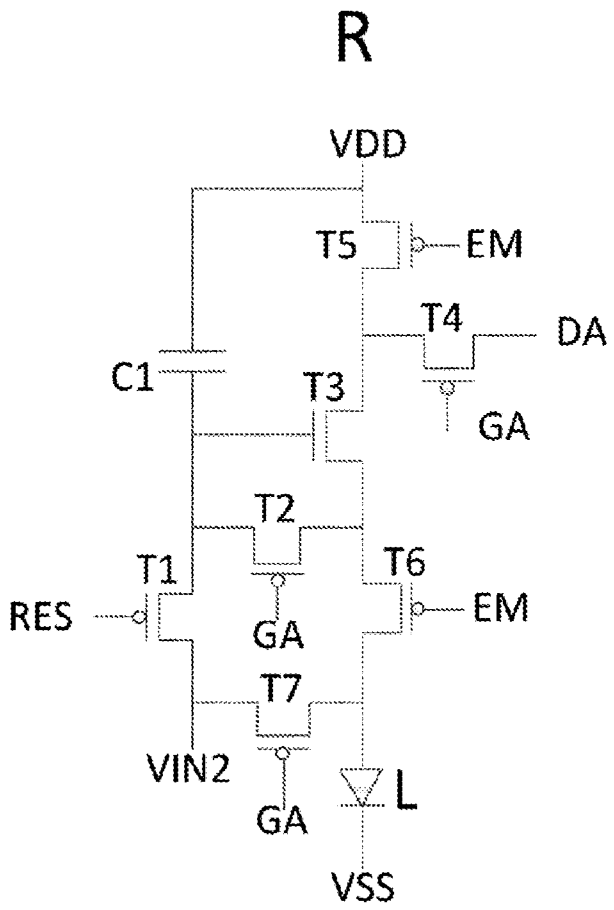
FIG. 3 is a schematic structural diagram of a driving circuit in a red subpixel according to an embodiment of the present disclosure.
Figure 4:
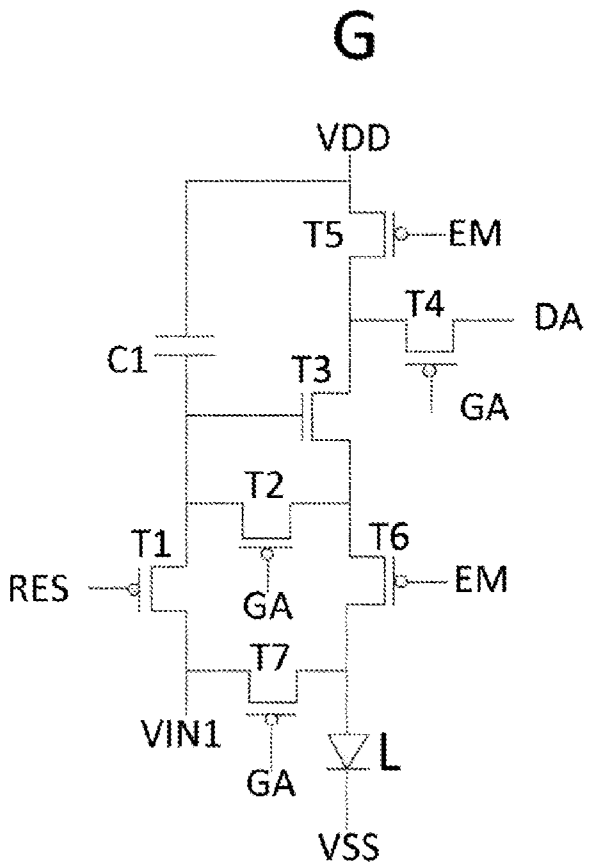
FIG. 4 is a schematic structural diagram of a driving circuit in a green subpixel according to an embodiment of the present disclosure.
Figure 5:
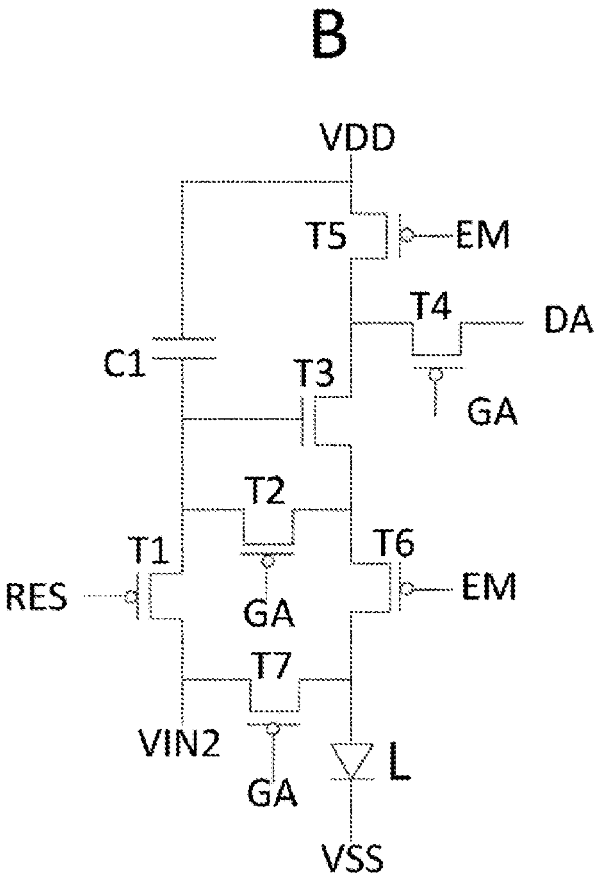
FIG. 5 is a schematic structural diagram of a driving circuit in a blue subpixel according to an embodiment of the present disclosure.

FIG. 3 is a schematic diagram of a driving circuit for a second subpixel (red subpixel R), FIG. 4 is a schematic diagram of a driving circuit for a first subpixel (green subpixel G), and FIG. 5 is a schematic diagram of a driving circuit for a third subpixel (blue subpixel B). As shown in FIGS. 3 to 5, the driving circuit includes a first initialization transistor T1, a second initialization transistor T7, a driving transistor T3, a data writing transistor T4, a threshold compensation transistor T2, a first light emission control transistor T5, a second light emission control transistor T6, and a storage capacitor C1.

A gate of the first initialization transistor T1 is electrically connected to a reset signal line RES, a first electrode of a first initialization transistor T1 in a driving circuit corresponding to the first subpixel (green subpixel G) is electrically connected to the first initialization voltage line VIN1, first electrodes of first initialization transistors in driving circuits corresponding to the second subpixel (red subpixel R) and the third subpixel (blue subpixel B) are each electrically connected to the second initialization voltage line VIN2, and a second electrode of the first initialization transistor T1 is electrically connected to a gate of the driving transistor T3.

A gate of the second initialization transistor T7 is electrically connected to a scanning signal line GA, a first electrode of a second initialization transistor T7 in a driving circuit corresponding to the first subpixel (green subpixel G) is electrically connected to the first initialization voltage line VIN1, first electrodes of second initialization transistors in driving circuits corresponding to the second subpixel (red subpixel R) and the third subpixel (blue subpixel B) are each electrically connected to the second initialization voltage line VIN2, and a second electrode of the second initialization transistor T7 is electrically connected to an anode of the light-emitting device L.

A gate of the first light emission control transistor T5 is electrically connected to a light emission control line EM, a first electrode of the first light emission control transistor T5 is electrically connected to a first power supply line VDD, and a second electrode of the first light emission control transistor T5 is electrically connected to a first electrode of the driving transistor T3.

A gate of the second light emission control transistor T6 is electrically connected to the light emission control line EM, a first electrode of the second light emission control transistor T6 is electrically connected to a second electrode of the driving transistor T3, and a second electrode of the second light emission control transistor T6 is electrically connected to the anode of the light-emitting device L. A cathode of the light-emitting device L is electrically connected to a second power supply line VSS.

A gate of the threshold compensation transistor T2 is electrically connected to the scanning signal line GA, a first electrode of the threshold compensation transistor T2 is electrically connected to the gate of the driving transistor T3, and a second electrode of the threshold compensation transistor T2 is electrically connected to the second electrode of the driving transistor T3.

A gate of the data writing transistor T4 is electrically connected to the scanning signal line GA, a first electrode of the first data writing transistor T4 is electrically connected to a data signal line DA, and a second electrode of the data writing transistor T4 is electrically connected to the first electrode of the driving transistor T3.

A first electrode of the storage capacitor C1 is electrically connected to the first power supply line VDD, and a second electrode of the storage capacitor C1 is electrically connected to the gate of the driving transistor T3.

Figure 6:
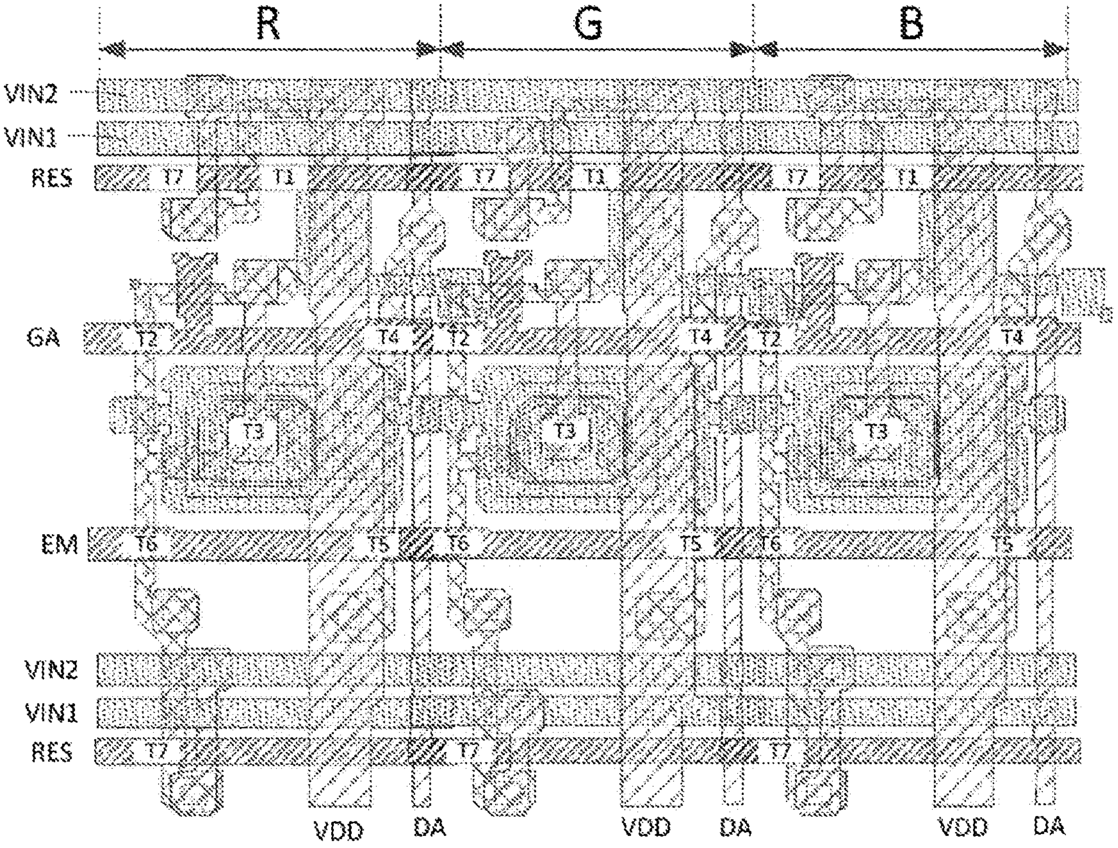
FIG. 6 is a schematic layout corresponding to FIGS. 3 to 5.

FIG. 6 is a schematic layout of the driving circuits corresponding to the three subpixels in FIGS. 3 to 5. As shown in FIG. 6, the driving circuits may be located in the bezel area BB in FIG. 1, or located in a part of the second display area AA2 adjacent to the first display area AA1 in FIG. 1, or distributed in the second display area AA2. In the driving circuit corresponding to the first subpixel (green subpixel G), first electrodes of the first initialization transistor T1 and the second initialization transistor T7 are each electrically connected to the first initialization voltage line VIN1. In the driving circuits corresponding to the second subpixel (red subpixel R) and the third subpixel (blue subpixel B), first electrodes of the first initialization transistor T1 and the second initialization transistor T7 are each electrically connected to the second initialization voltage line VIN2. Since the difference in lighting time between the red subpixel R and the blue subpixel B is small, the third subpixel (blue subpixel B) and the second subpixel (red subpixel R) may be both electrically connected to the second initialization voltage line VIN2, so that the initialization voltage input into the green subpixel G is set to be higher than that input into the red subpixel R, and the initialization voltages input into the red subpixel R and the blue subpixel B are set to be the same, to enable consistent charging time of the first, second and third subpixels, thereby solving the problem of purple defect in the first display area AA1.

Figure 7A:
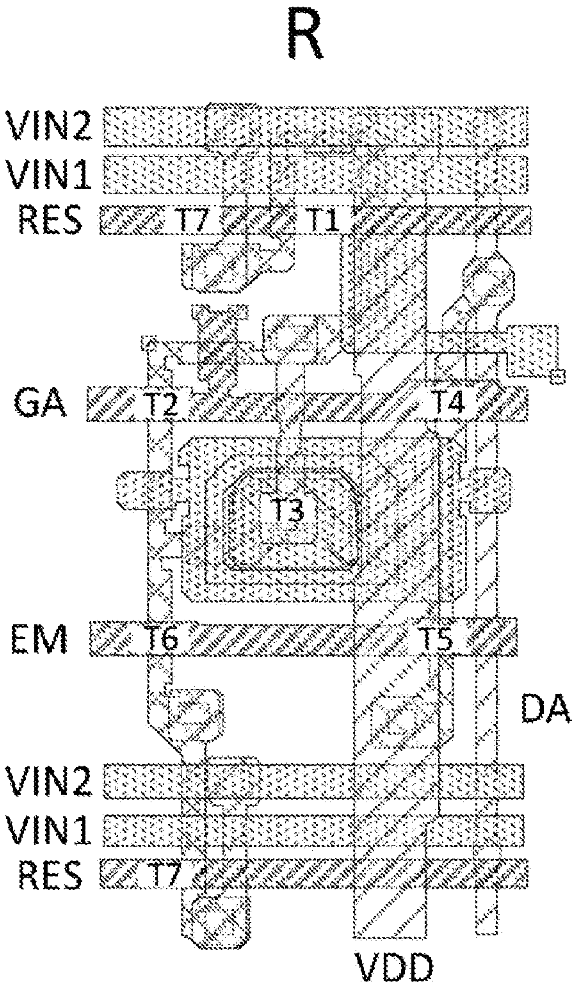
FIG. 7A is a schematic layout corresponding to FIG. 3.
Figure 7B:
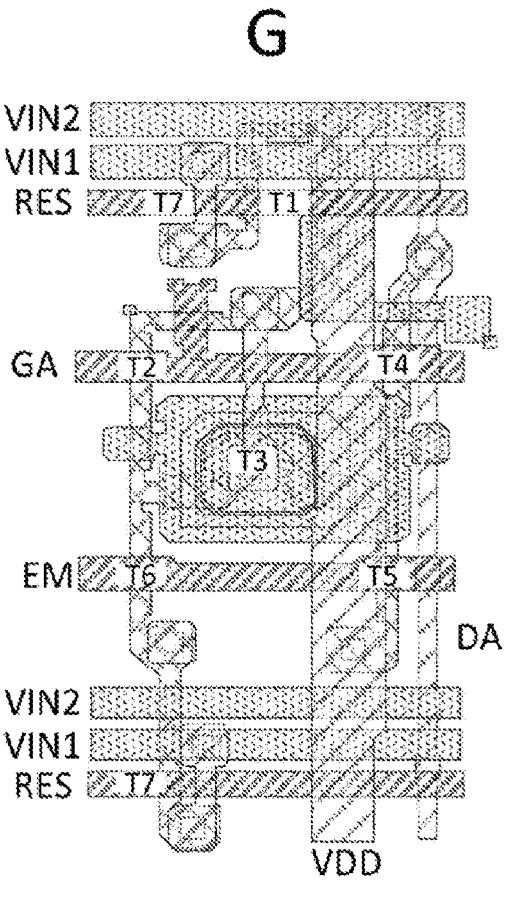
FIG. 7B is a schematic layout corresponding to FIG. 4.
Figure 7C:
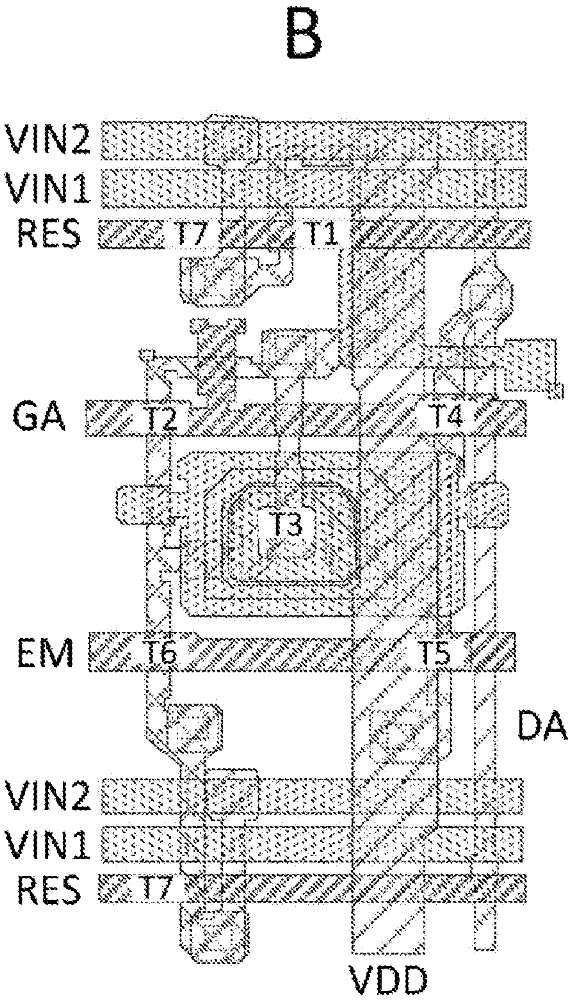
FIG. 7C is a schematic layout corresponding to FIG. 5.

To clarify the schematic layout of the driving circuits corresponding to the three subpixels in FIGS. 3 to 5, see FIGS. 7A to 7C, which are schematic layouts of the driving circuits corresponding to FIGS. 3 to 5, respectively. The second subpixel (red subpixel R) corresponding to FIG. 7A and the third subpixel (blue subpixel B) corresponding to FIG. 7C are each electrically connected to the second initialization voltage line VIN2, and the first subpixel (green subpixel G) corresponding to FIG. 7B is electrically connected to the first initialization voltage line VIN1.

In a specific implementation, in the display substrate provided in the embodiment of the present disclosure, as shown in FIG. 1, each pixel unit in the first display area AA1 further includes a third subpixel (blue subpixel B) emitting light of a color different from those of both the first subpixel (green subpixel G) and the second subpixel (red subpixel R).

The first display area AA1 further includes a third initialization voltage line (not shown) electrically connected to the third subpixel (blue subpixel B) and configured to receive an initialization voltage different from those of the first initialization voltage line and the second initialization voltage line. As shown in FIG. 2, since the green subpixel G takes a longer time to be lit than the red subpixel R, the red subpixel R takes a longer time to be lit than the blue subpixel B, and the three subpixels are electrically connected to different initialization voltage lines, corresponding initialization voltages may be input into the subpixels via respective initialization voltage lines. In other words, the initialization voltage input into the green subpixel G may be set to be higher than that input into the red subpixel R, and the initialization voltage input into the red subpixel R may be set to be higher than that input into the blue subpixel B. As a result, the first, second and third subpixels have consistent charging time, and the problem of purple defect in the first display area AA1 is solved.

In a specific implementation, the display substrate provided in the embodiment of the present disclosure includes a base substrate, a first gate metal layer, a second gate metal layer, and a source/drain metal layer which are sequentially stacked and insulated from each other.

The first initialization voltage line, the second initialization voltage line and the third initialization voltage line are arranged in the same layer as the first gate metal layer; or, the first initialization voltage line, the second initialization voltage line and the third initialization voltage line are arranged in the same layer as the second gate metal layer; or, two of the first initialization voltage line, the second initialization voltage line and the third initialization voltage line are arranged in the same layer as the first gate metal layer, while the rest one is arranged in the same layer as the second gate metal layer.

Specifically, in order to simplify the manufacturing process and ensure the thickness of the display substrate, in this embodiment, the first, second and third initialization voltage lines are arranged in the same layer and made of the same material as the first gate metal layer and/or the second gate metal layer, so that the first, second and third initialization voltage lines can be synchronously manufactured while the first gate metal layer and the second gate metal layer are prepared. The first, second and third initialization voltage lines may be all disposed in the first gate metal layer or the second gate metal layer, or disposed with two in the first gate metal layer and one in the second gate metal layer. Since the second gate metal layer is typically provided with an electrode plate of a capacitor and thus has larger space, it is preferred that the first, second and third initialization voltage lines are all disposed in the second gate metal layer.

In a specific implementation, in the display substrate provided in the embodiment of the present disclosure, as shown in FIG. 1, the first subpixel (green subpixel G), the second subpixel (red subpixel R) and the third subpixel (blue subpixel B) in the first display area AA1 each include a light-emitting device, and a driving circuit in the bezel area BB or the second display area AA2.

Figure 8:
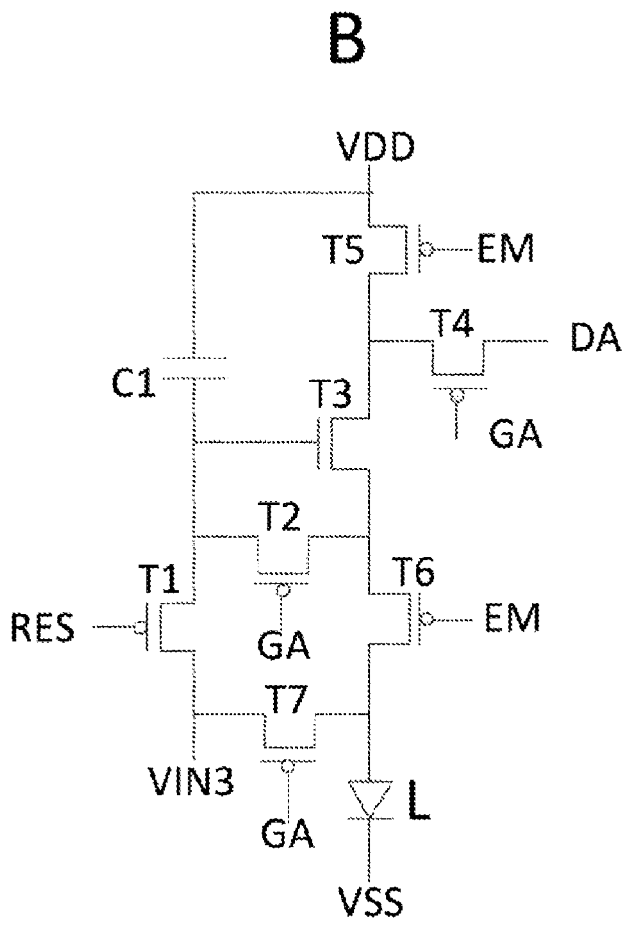
FIG. 8 is a schematic structural diagram of another driving circuit in a blue subpixel according to an embodiment of the present disclosure.

FIG. 8 is a schematic diagram of another driving circuit for a third subpixel (blue subpixel B). As shown in FIGS. 3, 4 and 8, the driving circuit includes a first initialization transistor T1, a second initialization transistor T7, a driving transistor T3, a data writing transistor T4, a threshold compensation transistor T2, a first light emission control transistor T5, a second light emission control transistor T6, and a storage capacitor C1.

A gate of the first initialization transistor T1 is electrically connected to a reset signal line RES, a first electrode of a first initialization transistor T1 in a driving circuit corresponding to the first subpixel (green subpixel G) is electrically connected to the first initialization voltage line VIN1, a first electrode of a first initialization transistor T1 in a driving circuit corresponding to the second subpixel (red subpixel R) is electrically connected to the second initialization voltage line VIN2, a first electrode of a first initialization transistor T1 in a driving circuit corresponding to the third subpixel (blue subpixel B) is electrically connected to the third initialization voltage line VIN3, and a second electrode of the first initialization transistor T1 is electrically connected to a gate of the driving transistor T3.

A gate of the second initialization transistor T7 is electrically connected to a scanning signal line GA, a first electrode of a second initialization transistor T7 in a driving circuit corresponding to the first subpixel (green subpixel G) is electrically connected to the first initialization voltage line VIN1, a first electrode of a second initialization transistor T7 in a driving circuit corresponding to the second subpixel (red subpixel R) is electrically connected to the second initialization voltage line VIN2, a first electrode of a second initialization transistor T7 in a driving circuit corresponding to the third subpixel (blue subpixel B) is electrically connected to the third initialization voltage line VIN3, and a second electrode of the second initialization transistor T7 is electrically connected to an anode of the light-emitting device L.

A gate of the first light emission control transistor T5 is electrically connected to a light emission control line EM, a first electrode of the first light emission control transistor T5 is electrically connected to a first power supply line VDD, and a second electrode of the first light emission control transistor T5 is electrically connected to a first electrode of the driving transistor T3.

A gate of the second light emission control transistor T6 is electrically connected to the light emission control line EM, a first electrode of the second light emission control transistor T6 is electrically connected to a second electrode of the driving transistor T3, and a second electrode of the second light emission control transistor T6 is electrically connected to the anode of the light-emitting device L. A cathode of the light-emitting device L is electrically connected to a second power supply line VSS.

A gate of the threshold compensation transistor T2 is electrically connected to the scanning signal line GA, a first electrode of the threshold compensation transistor T2 is electrically connected to the gate of the driving transistor T3, and a second electrode of the threshold compensation transistor T2 is electrically connected to the second electrode of the driving transistor T3.

A gate of the data writing transistor T4 is electrically connected to the scanning signal line GA, a first electrode of the first data writing transistor T4 is electrically connected to a data signal line DA, and a second electrode of the data writing transistor T4 is electrically connected to the first electrode of the driving transistor T3.

A first electrode of the storage capacitor C1 is electrically connected to the first power supply line VDD, and a second electrode of the storage capacitor C1 is electrically connected to the gate of the driving transistor T3.

Specifically, the driving circuits corresponding to the three subpixels shown in FIGS. 3, 4 and 8 may be located in the bezel area BB in FIG. 1, or located in a part of the second display area AA2 adjacent to the first display area AA1 in FIG. 1, or distributed in the second display area AA2. A first electrode of a first initialization transistor T1 in a driving circuit corresponding to the first subpixel (green subpixel G) is electrically connected to the first initialization voltage line VIN1, a first electrode of a first initialization transistor T1 in a driving circuit corresponding to the second subpixel (red subpixel R) is electrically connected to the second initialization voltage line VIN2, and a first electrode of a first initialization transistor T1 in a driving circuit corresponding to the third subpixel (blue subpixel B) is electrically connected to the third initialization voltage line VIN3. As shown in FIG. 2, since the green subpixel G takes a longer time to be lit than the red subpixel R, and the red subpixel R takes a longer time to be lit than the blue subpixel B, the first, second and third subpixels may be electrically connected to different initialization voltage lines, respectively, so that the initialization voltage input into the green subpixel G is set to be higher than that input into the red subpixel R, and the initialization voltage input into the red subpixel R is set to be higher than that input into the blue subpixel B. As a result, the first, second and third subpixels have consistent charging time, and the problem of purple defect in the first display area AA1 is solved.

Figure 9:
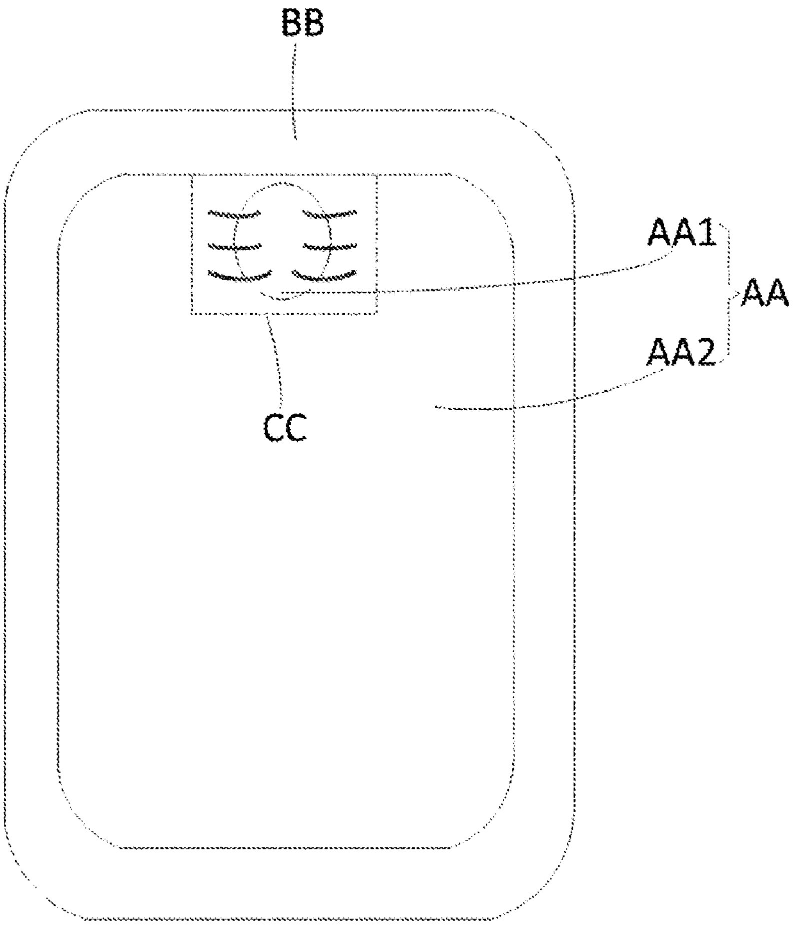
FIG. 9 is a schematic top view of another display substrate according to an embodiment of the present disclosure.

In a specific implementation, in the display substrate provided in the embodiment of the present disclosure, as shown in FIG. 1, the driving circuit is located in a part of the bezel area adjacent to the first display area AA1; or, as shown in FIG. 9, the second display area AA2 has a transition area CC adjacent to the first display area AA1, and the driving circuit is located in the transition area CC, or distributed in the second display area AA2.

In a specific implementation, the display substrate provided in the embodiment of the present disclosure further includes at least one transparent wiring layer between the driving circuit and the anode of the light-emitting device, and the driving circuit and the anode are electrically connected via a transparent wire in the transparent wiring layer.

Specifically, a plurality of transparent wiring layers insulated from each other may be provided, and each transparent wiring layer includes a plurality of transparent wires.

Optionally, in the display panel provided in the embodiments of the present disclosure, the plurality of transparent wires in each transparent wire layer do not overlap each other, and orthographic projections of the plurality of transparent wires in different transparent wire layers on the base substrate do not overlap each other. Apparently, since different transparent wiring layers are insulated from each other, in specific implementations, orthographic projections of the plurality of transparent wires in different transparent wiring layers on the substrate may be partially overlapped or completely overlapped, which is not limited herein.

Optionally, in the display panel provided in the embodiments of the present disclosure, the transparent wiring layer may be made of ITO.

In a specific implementation, in the display substrate provided in the embodiment of the present disclosure, as shown in FIGS. 1 and 9, The first display area AA1 may have a resolution lower than the second display area AA2, so that the first display area A1 has a transmittance higher than the second display area AA2, thereby implementing the under-display camera technology. Alternatively, the first display area AA1 and the second display area AA2 may have substantially the same resolution, so that the luminance of the under-display camera display area (the first display area AA1) can be increased, and the luminance difference between the main display area (i.e., the second display area AA2) and the under-display camera display area (i.e., the first display area AA1) can be reduced.

It should be noted that the first display area AA1 in the present disclosure may have a circular shape as shown in FIGS. 1 and 9, or may have other shapes, such as a rectangular shape, an elliptical shape, a polygonal shape or the like, which can be designed according to actual needs and is not limited herein. The second display area AA2 may surround a periphery of the first display area AA1, as shown in FIGS. 1 and 9; or may enclose a part of the first display area AA1, such as a left side, a lower side and a right side of the first display area AA1, while an upper boundary of the first display area AA1 coincides with an upper boundary of the second display area AA2.

Optionally, in the display substrate provided in the embodiment of the present disclosure, as shown in FIGS. 1 and 9, the first display area AA1 is configured to mount a photosensitive device, for example, a camera module. Since only the light-emitting device is present in the first display area AA1 of the present disclosure, a larger light-transmitting area can be provided, which is helpful for adapting to a camera module with a larger size.

Based on the same inventive concept, an embodiment of the present disclosure further provides a display apparatus, including a photosensitive device, and the display substrate as described above. The photosensitive device is disposed in the first display area of the display substrate. Optionally, the photosensitive device may be a camera module.

Based on a same inventive concept, an embodiment of the present disclosure further provides a method for driving the display substrate as described above.

As shown in FIG. 6, in an initialization stage, a first initialization voltage is loaded to the first subpixel (green subpixel G) through the first initialization voltage line VIN1, and a second initialization voltage is loaded to the second subpixel (red subpixel R) through the second initialization voltage line VIN2; where the first initialization voltage is greater than the second initialization voltage.

According to the method for driving the display substrate provided in the embodiments of the present disclosure, a first initialization voltage is loaded to the first subpixel through the first initialization voltage line, a second initialization voltage is loaded to the second subpixel through the second initialization voltage line, and the first initialization voltage is greater than the second initialization voltage, so that the first and second subpixels can have consistent charging time, and the problem of purple defect in the first display area is solved.

In a specific implementation, in the display substrate provided in the embodiment of the present disclosure, as shown in FIG. 6, the method further includes:

in the initialization stage, loading the second initialization voltage to the third subpixel (blue subpixel B) through the second initialization voltage line VIN2. As shown in FIG. 2, since the green subpixel G takes a longer time to be lit than the red subpixel R, the red subpixel R takes a longer time to be lit than the blue subpixel B, and the difference in lighting time between the red subpixel R and the blue subpixel B is small, the same initialization voltage as the second subpixel may be simultaneously input into the third subpixel (blue subpixel B) through the second initialization voltage line. In other words, the initialization voltage input into the green subpixel G may be set to be higher than that input into the red subpixel R, and the initialization voltages input into the red subpixel R and the blue subpixel B may be set to be the same, so that the first, second and third subpixels have consistent charging time, and thereby solving the problem of purple defect in the first display area AA1.

In a specific implementation, in the display substrate provided in the embodiment of the present disclosure, the first initialization voltage may be greater than the second initialization voltage by substantially 0.5V. Preferably, the first initialization voltage may be −2.0±0.2V, and the second initialization voltage may be −2.5±0.2V.

In a specific implementation, in the display substrate provided in the embodiment of the present disclosure, as shown in FIG. 1, each pixel unit in the first display area AA1 further includes a third subpixel (blue subpixel B) emitting light of a color different from those of both the first subpixel (green subpixel G) and the second subpixel (red subpixel R).

The first display area AA1 further includes a third initialization voltage line (not shown) electrically connected to the third subpixel (blue subpixel B) and configured to receive an initialization voltage different from those of the first initialization voltage line and the second initialization voltage line.

The method may further include:

in the initialization stage, loading a third initialization voltage to the third subpixel (blue subpixel B) through the third initialization voltage line VIN3; where the third initialization voltage is less than the second initialization voltage. Since the green subpixel G takes a longer time to be lit than the red subpixel R, and the red subpixel R takes a longer time to be lit than the blue subpixel B, the first, second and third subpixels may be electrically connected to different initialization voltage lines, respectively, so that the first initialization voltage input into the green subpixel G is set to be higher than that input into the red subpixel R, and the initialization voltage input into the red subpixel R is set to be higher than that input into the blue subpixel B. As a result, the first, second and third subpixels have consistent charging time, and the problem of purple defect in the first display area AA1 is solved.

In a specific implementation, in the display substrate provided in the embodiment of the present disclosure, the first initialization voltage may be greater than the second initialization voltage by substantially 0.2V, and the second initialization voltage may be greater than the third initialization voltage by substantially 0.3V. Preferably, the first initialization voltage may be −2.0±0.2V, the second initialization voltage may be −2.2±0.2V, and the third initialization voltage may be −2.5±0.2V.

According to the display substrate, the driving method therefor, and the display apparatus provided in the embodiments of the present disclosure, since the lighting time (i.e., charging time) of the subpixel is closely related with a potential at an anode of the light-emitting device, and the potential at the anode of the light-emitting device is related to an initialization voltage, the charging time (i.e., lighting time) may be reduced by increasing the initialization voltage. Therefore, by transmitting initialization voltages to the first subpixel and the second subpixel by the first initialization voltage line and the second initialization voltage line in the display substrate respectively, the embodiments of the present disclosure can enable the first subpixel and the second subpixel to receive different initialization voltages. In this way, for example, when the purple defect occurs in the first display area due to the fact that the first subpixel in the first display area takes a too long time to be lit, an initialization voltage, which is greater than the initialization voltage input into the second subpixel by the second initialization voltage line, can be input into the first subpixel by the first initialization voltage line to enable consistent charging time of the first and second subpixels, thereby solving the problem of purple defect in the first display area.

While the preferred embodiments of the present disclosure have been described, additional changes and modifications to those embodiments may occur to those skilled in the art once they learn about the basic inventive concepts. Therefore, it is intended that the appended claims should be interpreted as including the preferred embodiments and all changes and modifications that fall within the scope of the present disclosure.

It will be apparent to those skilled in the art that various changes and variations may be made to the embodiments of the present disclosure without departing from the spirit and scope of the embodiments of the present disclosure. Thus, if such modifications and variations to the embodiments of the present disclosure are within the scope of the claims of the present disclosure and their equivalents, the present disclosure is also intended to encompass such modifications and variations.

What is claimed is:

1. A display substrate, having a display area and a bezel area, wherein the display area comprises a first display area and a second display area; the first display area has a light transmittance higher than a light transmittance of the second display area;

the first display area comprises a plurality of pixel units distributed in an array, each of the plurality of pixel units comprising a first subpixel and a second subpixel emitting different colors of light; and the first display area comprises a first initialization voltage line and a second initialization voltage line, wherein the first initialization voltage line is electrically connected to the first subpixel, the second initialization voltage line is electrically connected to the second subpixel, and the first initialization voltage line and the second initialization voltage line are configured to receive different initialization voltages, wherein the pixel unit further comprises a third subpixel emitting light of a color different from the colors of both the first subpixel and the second subpixel, and the third subpixel is electrically connected to the second initialization voltage line, wherein the display substrate comprises a base substrate, a first gate metal layer, a second gate metal layer, and a source/drain metal layer which are sequentially stacked;

wherein the first initialization voltage line and the second initialization voltage line are in the same layer as the first gate metal layer; or, the first initialization voltage line and the second initialization voltage line are in the same layer as the second gate metal layer; or, one of the first initialization voltage line and the second initialization voltage line is in the same layer as the first gate metal layer, while the other of the first initialization voltage line and the second initialization voltage line is in the same layer as the second gate metal layer.

2. The display substrate according to claim 1, wherein each of the first, second, and third subpixels comprise a light-emitting device, and a driving circuit in the bezel area or the second display area;

the driving circuit comprises a first initialization transistor, a second initialization transistor, a driving transistor, a data writing transistor, a threshold compensation transistor, a first light emission control transistor, a second light emission control transistor, and a storage capacitor;

a gate of the first initialization transistor is electrically connected to a reset signal line, a first electrode of a first initialization transistor in a driving circuit corresponding to the first subpixel is electrically connected to the first initialization voltage line, first electrodes of first initialization transistors in driving circuits corresponding to the second subpixel and the third subpixel are each electrically connected to the second initialization voltage line, and a second electrode of the first initialization transistor is electrically connected to a gate of the driving transistor;

a gate of the second initialization transistor is electrically connected to a scanning signal line, a first electrode of a second initialization transistor in the driving circuit corresponding to the first subpixel is electrically connected to the first initialization voltage line, first electrodes of second initialization transistors in the driving circuits corresponding to the second subpixel and the third subpixel are each electrically connected to the second initialization voltage line, and a second electrode of the second initialization transistor is electrically connected to an anode of the light-emitting device;

a gate of the first light emission control transistor is electrically connected to a light emission control line, a first electrode of the first light emission control transistor is electrically connected to a first power supply line, and a second electrode of the first light emission control transistor is electrically connected to a first electrode of the driving transistor;

a gate of the second light emission control transistor is electrically connected to the light emission control line, a first electrode of the second light emission control transistor is electrically connected to a second electrode of the driving transistor, and a second electrode of the second light emission control transistor is electrically connected to the anode of the light-emitting device; a cathode of the light-emitting device is electrically connected to a second power supply line;

a gate of the threshold compensation transistor is electrically connected to the scanning signal line, a first electrode of the threshold compensation transistor is electrically connected to the gate of the driving transistor, and a second electrode of the threshold compensation transistor is electrically connected to the second electrode of the driving transistor;

a gate of the data writing transistor is electrically connected to the scanning signal line, a first electrode of the first data writing transistor is electrically connected to a data signal line, and a second electrode of the data writing transistor is electrically connected to the first electrode of the driving transistor; and a first electrode of the storage capacitor is electrically connected to the first power supply line, and a second electrode of the storage capacitor is electrically connected to the gate of the driving transistor.

3. The display substrate according to claim 2, wherein the driving circuit is in a part of the bezel area adjacent to the first display area; or, the second display area has a transition area adjacent to the first display area, and the driving circuit is in the transition area.

4. The display substrate according to claim 2, further comprising at least one transparent wiring layer between the driving circuit and the anode of the light-emitting device, and the driving circuit and the anode are electrically connected via a transparent wire in the transparent wiring layer.

5. The display substrate according to claim 1, wherein the pixel unit further comprises a third subpixel emitting light of a color different from the colors of both the first subpixel and the second subpixel; and the first display area further comprises a third initialization voltage line electrically connected to the third subpixel and configured to receive an initialization voltage different from the initialization voltages of the first initialization voltage line and the second initialization voltage line.

6. The display substrate according to claim 5, comprising a base substrate, a first gate metal layer, a second gate metal layer, and a source/drain metal layer which are sequentially stacked;

wherein the first initialization voltage line, the second initialization voltage line and the third initialization voltage line are in the same layer as the first gate metal layer; or, the first initialization voltage line, the second initialization voltage line and the third initialization voltage line are in the same layer as the second gate metal layer; or, two of the first initialization voltage line, the second initialization voltage line and the third initialization voltage line are arranged in the same layer as the first gate metal layer, while the rest one of the first initialization voltage line, the second initialization voltage line and the third initialization voltage line is arranged in the same layer as the second gate metal layer.

7. The display substrate according to claim 5, wherein each of the first, second, and third subpixels comprise a light-emitting device, and a driving circuit in the bezel area or the second display area;

the driving circuit comprises a first initialization transistor, a second initialization transistor, a driving transistor, a data writing transistor, a threshold compensation transistor, a first light emission control transistor, a second light emission control transistor, and a storage capacitor;

a gate of the first initialization transistor is electrically connected to a reset signal line, a first electrode of a first initialization transistor in a driving circuit corresponding to the first subpixel is electrically connected to the first initialization voltage line, a first electrode of a first initialization transistor in a driving circuit corresponding to the second subpixel is electrically connected to the second initialization voltage line, a first electrode of a first initialization transistor in a driving circuit corresponding to the third subpixel is electrically connected to the third initialization voltage line, and a second electrode of the first initialization transistor is electrically connected to a gate of the driving transistor;

a gate of the second initialization transistor is electrically connected to a scanning signal line, a first electrode of a second initialization transistor in the driving circuit corresponding to the first subpixel is electrically connected to the first initialization voltage line, a first electrode of a second initialization transistor in the driving circuit corresponding to the second subpixel is electrically connected to the second initialization voltage line, a first electrode of a second initialization transistor in the driving circuit corresponding to the third subpixel is electrically connected to the third initialization voltage line, and a second electrode of the second initialization transistor is electrically connected to an anode of the light-emitting device;

a gate of the first light emission control transistor is electrically connected to a light emission control line, a first electrode of the first light emission control transistor is electrically connected to a first power supply line, and a second electrode of the first light emission control transistor is electrically connected to a first electrode of the driving transistor;

a gate of the second light emission control transistor is electrically connected to the light emission control line, a first electrode of the second light emission control transistor is electrically connected to a second electrode of the driving transistor, and a second electrode of the second light emission control transistor is electrically connected to the anode of the light-emitting device; a cathode of the light-emitting device is electrically connected to a second power supply line;

a gate of the threshold compensation transistor is electrically connected to the scanning signal line, a first electrode of the threshold compensation transistor is electrically connected to the gate of the driving transistor, and a second electrode of the threshold compensation transistor is electrically connected to the second electrode of the driving transistor;

a gate of the data writing transistor is electrically connected to the scanning signal line, a first electrode of the first data writing transistor is electrically connected to a data signal line, and a second electrode of the data writing transistor is electrically connected to the first electrode of the driving transistor; and a first electrode of the storage capacitor is electrically connected to the first power supply line, and a second electrode of the storage capacitor is electrically connected to the gate of the driving transistor.

8. The display substrate according to claim 7, wherein the driving circuit is in a part of the bezel area adjacent to the first display area; or, the second display area has a transition area adjacent to the first display area, and the driving circuit is in the transition area, wherein the display substrate further comprises at least one transparent wiring layer between the driving circuit and the anode of the light-emitting device, and the driving circuit and the anode are electrically connected via a transparent wire in the transparent wiring layer.

9. The display substrate according to claim 5, wherein the first subpixel is a green subpixel, the second subpixel is a red subpixel, and the third subpixel is a blue subpixel.

10. The display substrate according to claim 1, wherein the first subpixel is a green subpixel, the second subpixel is a red subpixel, and the third subpixel is a blue subpixel.

11. The display substrate according to claim 1, wherein the first display area has a resolution lower than a resolution of the second display area, or the first display area and the second display area have substantially the same resolution.

12. The display substrate according to claim 1, wherein the first display area has a shape comprising at least one of a circular shape, an elliptical shape, a rectangular shape, or a polygonal shape.

13. A display apparatus, comprising a photosensitive device, and the display substrate according to claim 1; wherein the photosensitive device is in the first display area of the display substrate.

14. A method for driving the display substrate according to claim 1, comprising:

in an initialization stage, loading a first initialization voltage to the first subpixel through the first initialization voltage line, and loading a second initialization voltage to the second subpixel through the second initialization voltage line;

wherein the first initialization voltage is greater than the second initialization voltage.

15. The method according to claim 14, further comprising:

in the initialization stage, loading the second initialization voltage to the third subpixel through the second initialization voltage line.

16. The method according to claim 15, wherein the first initialization voltage is greater than the second initialization voltage by substantially 0.5V.

17. The method according to claim 14, wherein each of the plurality of pixel units in the first display area further comprises a third subpixel emitting light of a color different from the colors of both the first subpixel and the second subpixel; and the display area of the display substrate further comprises a third initialization voltage line electrically connected to the third subpixel and configured to receive an initialization voltage different from the initialization voltages of the first initialization voltage line and the second initialization voltage line; and the method further comprises:

in the initialization stage, loading a third initialization voltage to the third subpixel through the third initialization voltage line;

wherein the third initialization voltage is less than the second initialization voltage.

18. The method according to claim 17, wherein the first initialization voltage is greater than the second initialization voltage by substantially 0.2V, and the second initialization voltage is greater than the third initialization voltage by substantially 0.3V.

* * * * *